(12) United States Patent
Vansickel et al.

(10) Patent No.: US 10,514,157 B2
(45) Date of Patent: Dec. 24, 2019

(54) WHIP LIGHT SYSTEM

(71) Applicant: Audio Accessories Group, LLC, Tempe, AZ (US)

(72) Inventors: Larry Vansickel, Phoenix, AZ (US); Wang Hai, Ningbo (CN); Gu Wendong, Ningbo (CN); Zhou Liang, Ningbo (CN)

(*) Notice: Subject to any disclaimer, the term of this patent is extended or adjusted under 35 U.S.C. 154(b) by 0 days.

(21) Appl. No.: 15/984,332

(22) Filed: May 19, 2018

(65) Prior Publication Data
US 2019/0353338 A1 Nov. 21, 2019

(51) Int. Cl.
| | |
|---|---|
| *F21V 23/06* | (2006.01) |
| *F21V 23/00* | (2015.01) |
| *F21V 23/04* | (2006.01) |
| *B60Q 1/00* | (2006.01) |
| *F21V 31/00* | (2006.01) |
| *F21Y 113/17* | (2016.01) |
| *F21Y 103/10* | (2016.01) |
| *F21Y 115/10* | (2016.01) |

(52) U.S. Cl.
CPC ............ *F21V 23/06* (2013.01); *B60Q 1/0088* (2013.01); *F21V 23/008* (2013.01); *F21V 23/0435* (2013.01); *F21V 31/00* (2013.01); *F21Y 2103/10* (2016.08); *F21Y 2113/17* (2016.08); *F21Y 2115/10* (2016.08)

(58) Field of Classification Search
CPC .... F21V 23/06; F21V 23/008; F21V 23/0435; F21V 31/00; B60Q 1/0088; F21Y 2113/17; F21Y 2103/10; F21Y 2115/10
See application file for complete search history.

(56) References Cited

U.S. PATENT DOCUMENTS

| | | | |
|---|---|---|---|
| 3,144,527 A | 8/1964 | Tolegian | |
| 3,786,391 A | 1/1974 | Mathauser | |
| 5,218,369 A * | 6/1993 | Jennings | ................ H01Q 1/088 |
| | | | 343/702 |
| 9,050,929 B2 | 6/2015 | Clifford | |
| 2014/0085881 A1* | 3/2014 | Clifford | ............... B60Q 1/2657 |
| | | | 362/235 |
| 2015/0146449 A1* | 5/2015 | Freiser | ....................... B62J 6/04 |
| | | | 362/523 |

* cited by examiner

*Primary Examiner* — Mary Ellen Bowman
(74) *Attorney, Agent, or Firm* — Keith L. Jenkins, Registered Patent Attorney, LLC; Keith L. Jenkins

(57) ABSTRACT

A whip light with a controller in the base of the whip light that responds to inputs via a downloadable smart phone application to control color, brightness, and flashing patterns, where the handle and tube portion of the whip light can be installed on a base and removed from a base with one hand. The base is attachable to a vehicle. The electrical interface between the handle and base includes two five-element magnetic connectors brought into abutment by attaching the handle to the base. The magnetic connectors are mounted on respective small PCBs. The mechanical interface between the handle and base includes circumferentially arranged spring-biased ball bearings in a connector portion of the handle which mates with a neck of a cover for the base. The tube encloses a plurality of light sources, preferably RGB and white LEDs that emit light radially from the long axis of the tube.

20 Claims, 5 Drawing Sheets

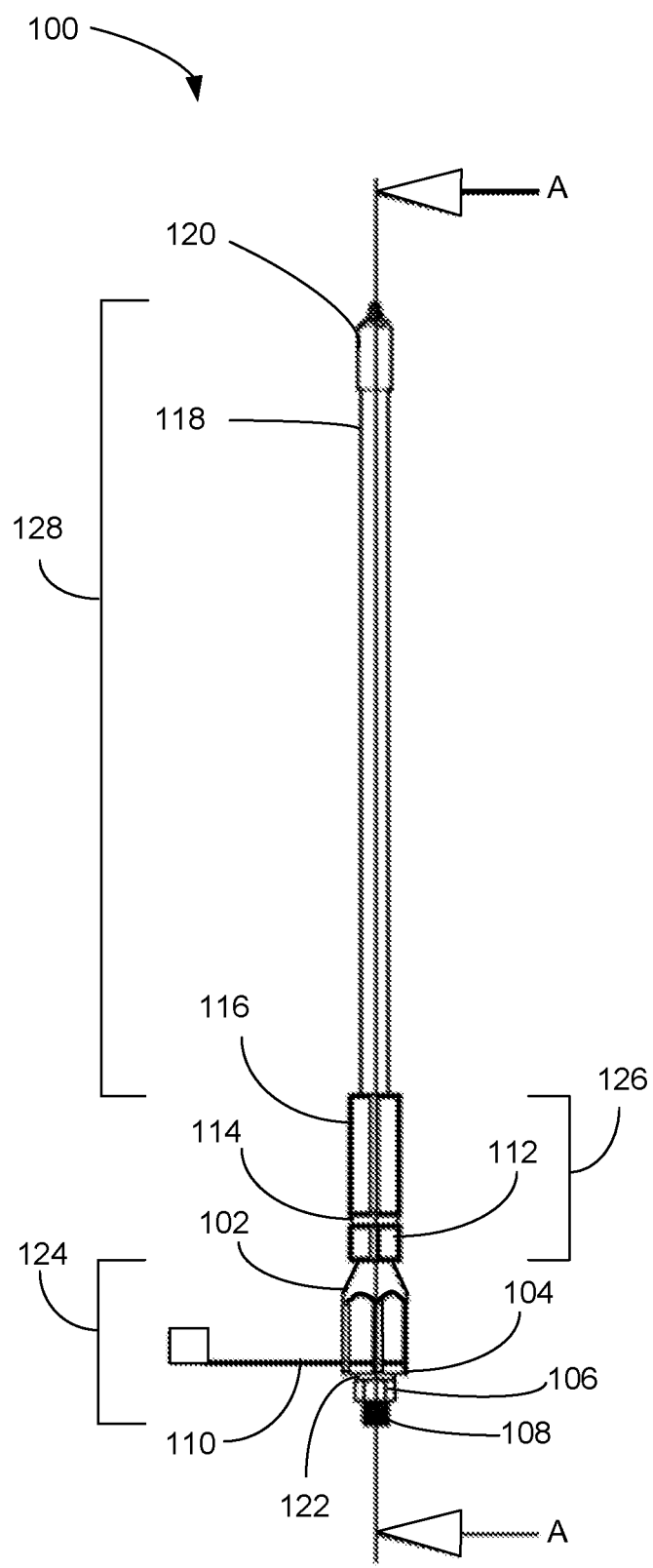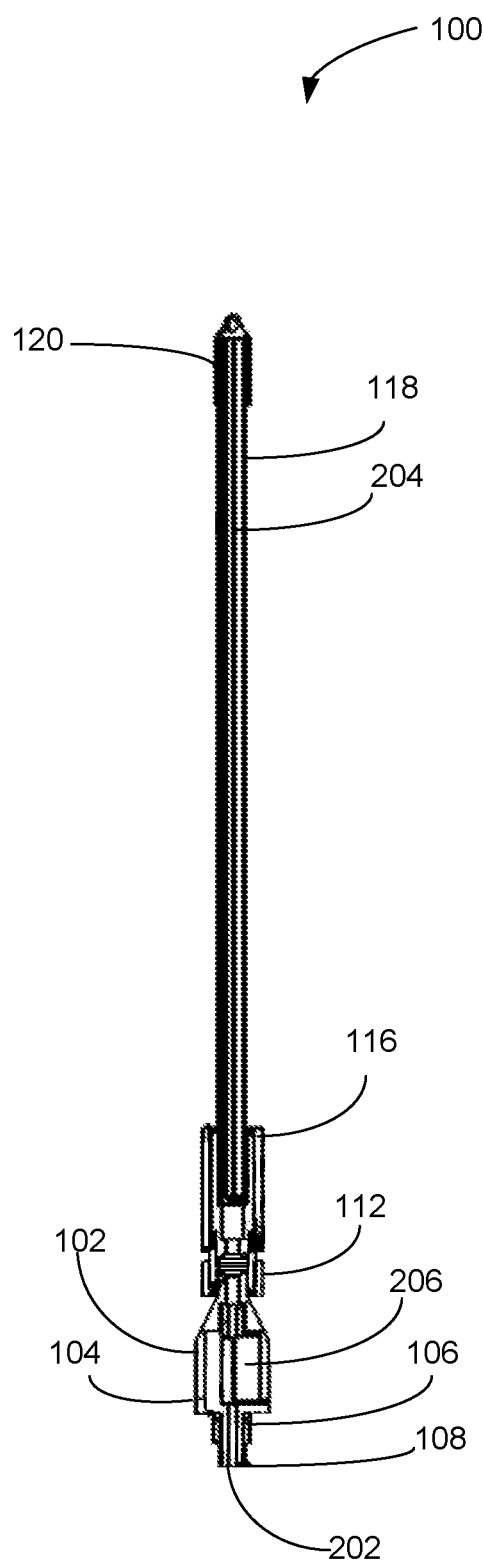
FIG. 1
FIG. 2

WHIP LIGHT SYSTEM

FIELD OF ART

The present invention relates to flexible lighted rods used to identify vehicles, primarily off-road vehicles, at night. The present invention more particularly relates to a whip light with a controller in the base of the whip light that responds to inputs via a smart phone application to control color, brightness, and flashing pattern; and to a whip light that can be installed and removed with one hand.

BACKGROUND OF THE INVENTION

A whip light is a long transparent or translucent tube containing a plurality of light sources and is connected to a handle that is releasably connected to a base. The base is connected to a vehicle and provides a conduit for power and control lines. A number of whip lights are available on the market. Typically, the available lights have controllers, if any, separate from the whip light and the typical whip light requires two-handed operation to connect or disconnect the handle from the base.

SUMMARY OF THE INVENTION

Briefly described, the invention includes a whip light with a controller in the base of the whip light that responds to inputs via a smart phone application to control color, brightness, and flashing pattern; and to a whip light that can be installed and removed with one hand.

DESCRIPTION OF THE FIGURES OF THE DRAWINGS

The present invention will hereinafter be described in conjunction with the following drawing figures, wherein like numerals denote like elements, and FIG. 1 is a side elevation view illustrating an exemplary embodiment of a whip light of an exemplary whip light system of FIG. 3 defining cross section AA, according to a preferred embodiment of the present invention.

FIG. 2 is a cross sectional view, through cross section AA, illustrating the exemplary embodiment of the whip light of FIG. 1 of the whip light system of FIG. 3, according to a preferred embodiment of the present invention;

DETAILED DESCRIPTION OF THE INVENTION

Figure 3:
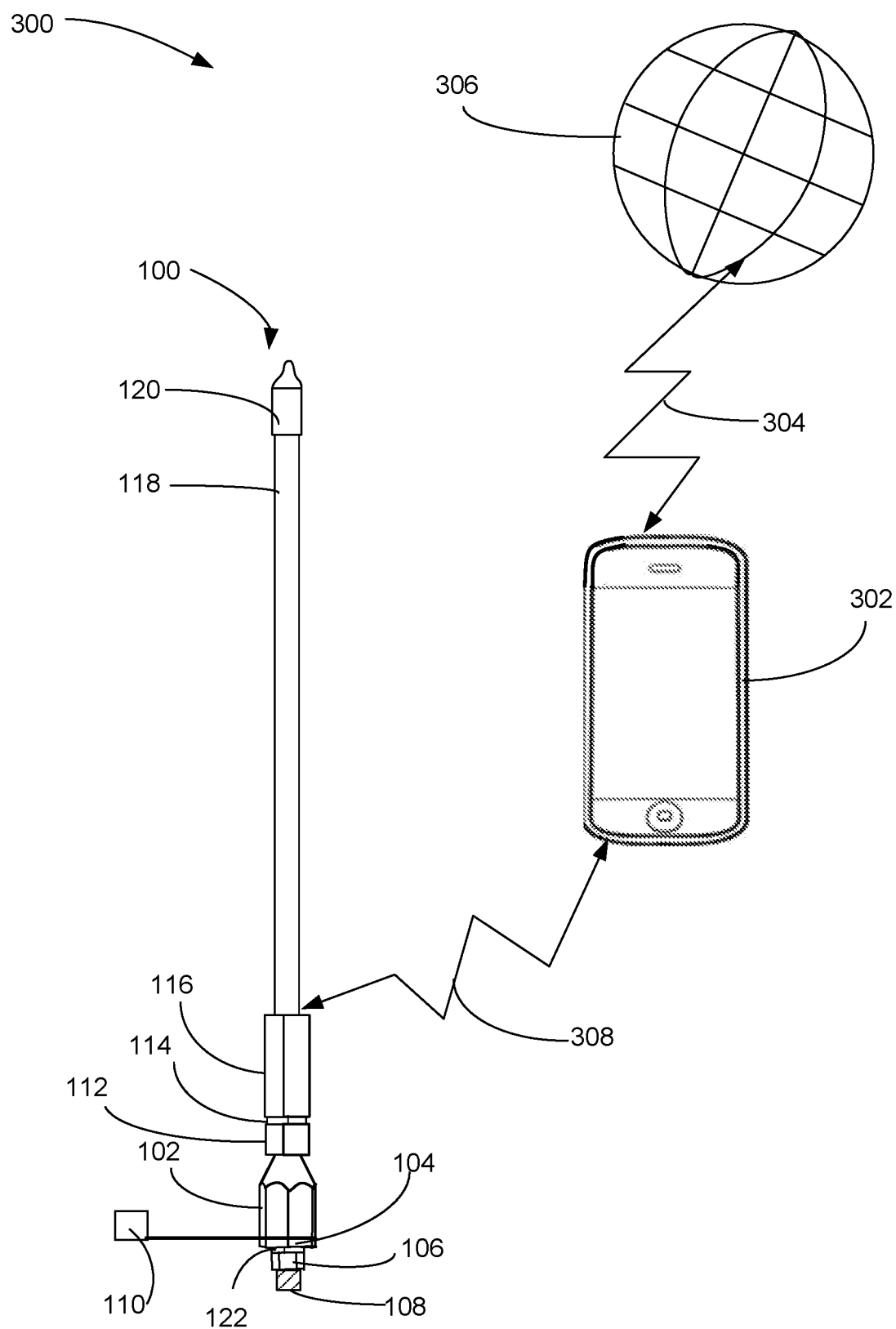
FIG. 3 is a diagrammatic view illustrating an exemplary embodiment of the whip light system, according to a preferred embodiment of the present invention.

FIG. 1 is a side elevation view illustrating an exemplary embodiment of a whip light 100 of an exemplary whip light system 300 of FIG. 3 defining cross section AA, according to a preferred embodiment of the present invention. Whip light 100 includes base 124, handle 126, and light rod 128. Base 124 includes base cover 102 and an internal circuitry section 430 (see FIG. 4), the extended lower perimeter 104 of which is visible in this view. Base cover 102 is preferably made of aluminum. In various embodiments, other materials of similar strength may be used for base cover 102. The base 124 also includes flexible water-tight cover 110, which has an annular portion clamped between the extended lower perimeter 104 of internal circuitry section 430 and the bottom edge of base cover 102. Base 124 also includes lower hollow threaded tube 108 that extends downward from the internal circuitry section 430 and, during shipping and storage supports a lock washer 122 and a nut 106, as shown. Lower hollow threaded tube 108 provides a conduit for vehicle power lines 604 (see FIG. 6), when installed.

Connector portion 112 of handle 126 provides a quick, one-handed, disconnect and magnetic electrical connectors, which will be further described below. Handle connector portion 112 partially receives an interface connector support 410 (see FIG. 4) that has an extended perimeter section 114 that is visible in this view. Handle sleeve 116 of handle 126 supports light tube 118 and provides a fixed interface to connector portion 112 of handle 126. Handle 126 is preferably made of aluminum. In various embodiments, other materials of similar strength may be used for handle 126. While light tube 118 is illustrated as having a right circular cylindrical cross section, that is not a limitation of the present invention. For example, in some embodiments, the cross section of light tube 118 may be polygonal, ellipsoidal, or curved in an irregular pattern.

Figure 4:
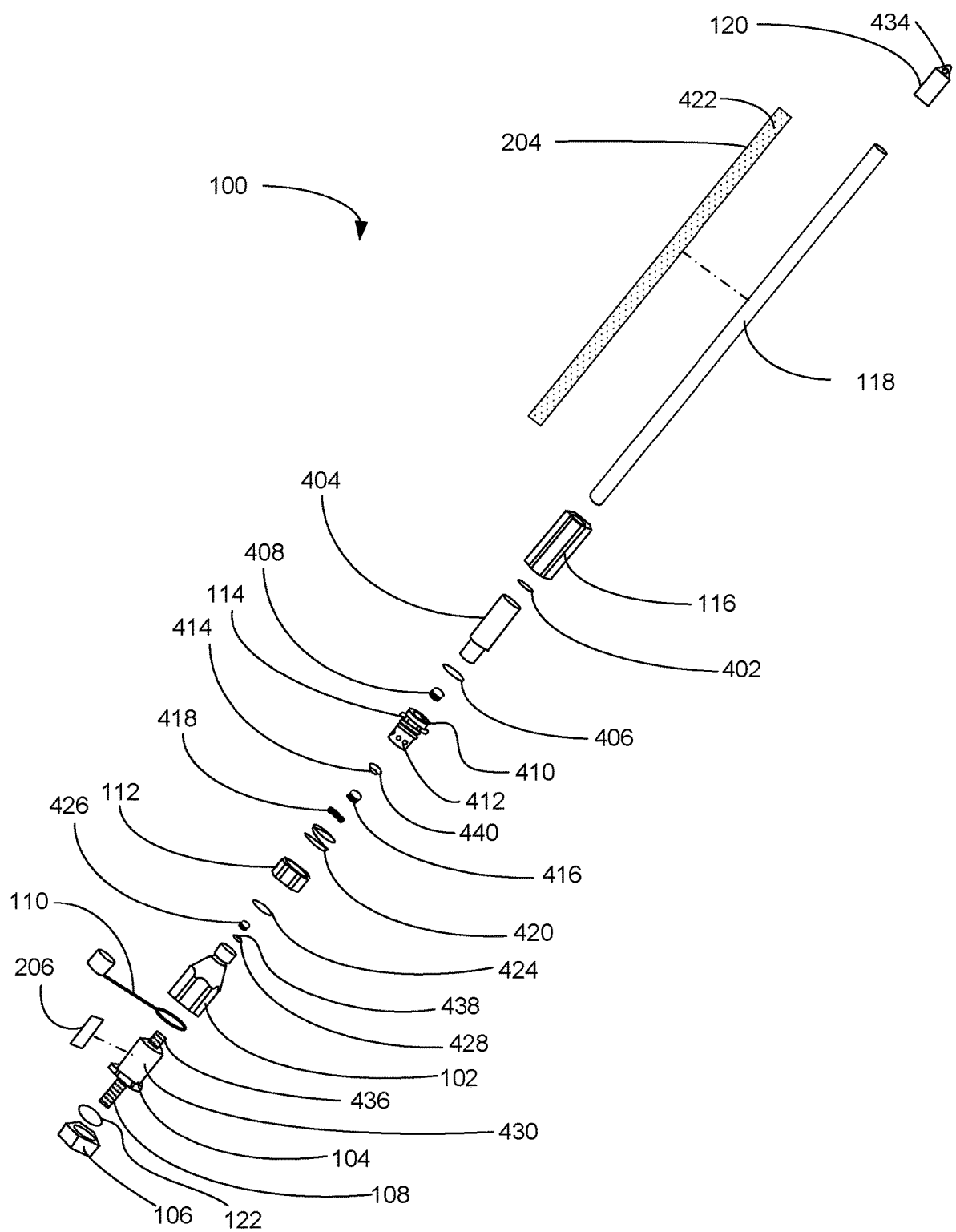
FIG. 4 is an exploded perspective view illustrating the exemplary embodiment of the whip light of FIG. 1 of the whip light system of FIG. 3, according to a preferred embodiment of the present invention.

Light rod 128 includes light tube 118, water-tight cap 120, and an elongated PCB 204 (see FIG. 2) supporting light sources 422 (see FIG. 4). Light tube 118 is preferably transparent, but may be translucent in some embodiments. Light tube 118 is preferably made of an ultraviolet light-resistant reinforced polycarbonate that has some flexibility. Light tube 118 encloses an elongated printed circuit board (PCB) 204 upon which are mounted a plurality of light sources 422, preferably light-emitting diodes (LEDs) 422. Preferably, the LEDs 422 include red-green-blue (RGB) and white LEDs 422. In various embodiments, other light sources 422 of similar illumination may be substituted for LEDs 422, and may be monochromatic. Light tube 118 supports water-tight cap 120 that features a tip with a hole 434 (see FIG. 4) for optionally attaching a flag. Light sources 422 are preferably arranged on the elongated PCB 204 to emit light radially from a long axis of the light tube 118.

FIG. 2 is a cross sectional view, through cross section AA, illustrating an exemplary embodiment of the whip light 100 of FIG. 1 of the whip light system 300 of FIG. 3, according to a preferred embodiment of the present invention. The passage 202 through lower hollow threaded tube 108 is a conduit for power lines 604 (see FIG. 6). PCB 206, which includes a Bluetooth® transceiver and controls for the LEDs 422 that are mounted on elongated PCB 204 within light tube 118.

FIG. 3 is a diagrammatic view illustrating an exemplary embodiment of the whip light system 300, according to a preferred embodiment of the present invention. An application is downloaded 304 (once) from the Internet 306 to smart phone 302. That application communicates via Bluetooth® link 308 to an antenna on elongated PCB 204 within light tube 118. The application enables a user to control color, brightness, and flashing of the lights sources (including marquee flashing).

FIG. 4 is an exploded perspective view illustrating an exemplary embodiment of the whip light 100 of FIG. 1 of the whip light system 300, according to a preferred embodiment of the present invention. Internal circuitry section 430 is a cylindrical shell with extended lower perimeter 104, lower hollow threaded tube 108, and upper hollow threaded tube 436. Upper hollow threaded tube 436 threads into complimentary threads inside a top portion of the base cover 102 to fasten internal circuitry section 430 to the base cover 102. The PCB 206 is mounted within internal circuitry section 430 and is connected to power lines 604 through lower hollow threaded tube 108. Lower hollow threaded tube 108 is used to fasten the base 124 to a vehicle (see FIGS. 6 and 7). PCB 206 is preferably magnetically and electrically connected to second magnetic electrical connector 414 via first magnetic electrical connector 438 for power and for control of the LEDs 422 and for an antenna for the Bluetooth® transceiver, when the handle 126 is coupled to the base 124. First magnetic electrical connector 438 is mounted on a small PCB 428 that fits in the top of base cover 102. A water proof grommet 426 also fits in the top of base cover 102 to prevent moisture from entering PCBs 206 and 428.

Handle connector portion 112 receives and retains spacer ring 424 to support spring 420. Ball bearings 418 are retained in sockets 412 of interface connector support 410 and biased inward by spring 420. Second magnetic electrical connector 414 is mounted on a second small PCB 440 and mates with first magnetic electrical connector 438 when installed and the handle 126 is connected to the base 124. A water proof grommet 416 covers second small PCB 440 and seals the perimeter thereof against moisture. The portion of interface connector support 410 below extended perimeter section 114 is mounted inside connector portion 112. The external diameter of the lower portion of interface connector support 410 fits slidingly over head 506 (see FIGS. 5 and 7). An additional waterproof grommet 408 protects the top side of second small PCB 440 within the interface connector support 410. Wires extending from the top of second small PCB 440 are threaded through waterproof grommet 408, waterproof ring 406, wire sleeve 404, and additional waterproof ring 402 to connect to elongated PCB 204 within light tube 118. Waterproof rings 406 and 402 are preferably O-rings. Light tube 118 terminates with a water-tight cap 120 that has tip with a hole 434 there through for optionally attaching a flag or streamer. The top of interface connector support 410 is a threaded tube which threads into the bottom of handle sleeve 116 to fasten interface connector support 410 to handle sleeve 116. Wire sleeve 404 is preferably plastic with a smooth interior to avoid abrading wires therein.

Figure 5:
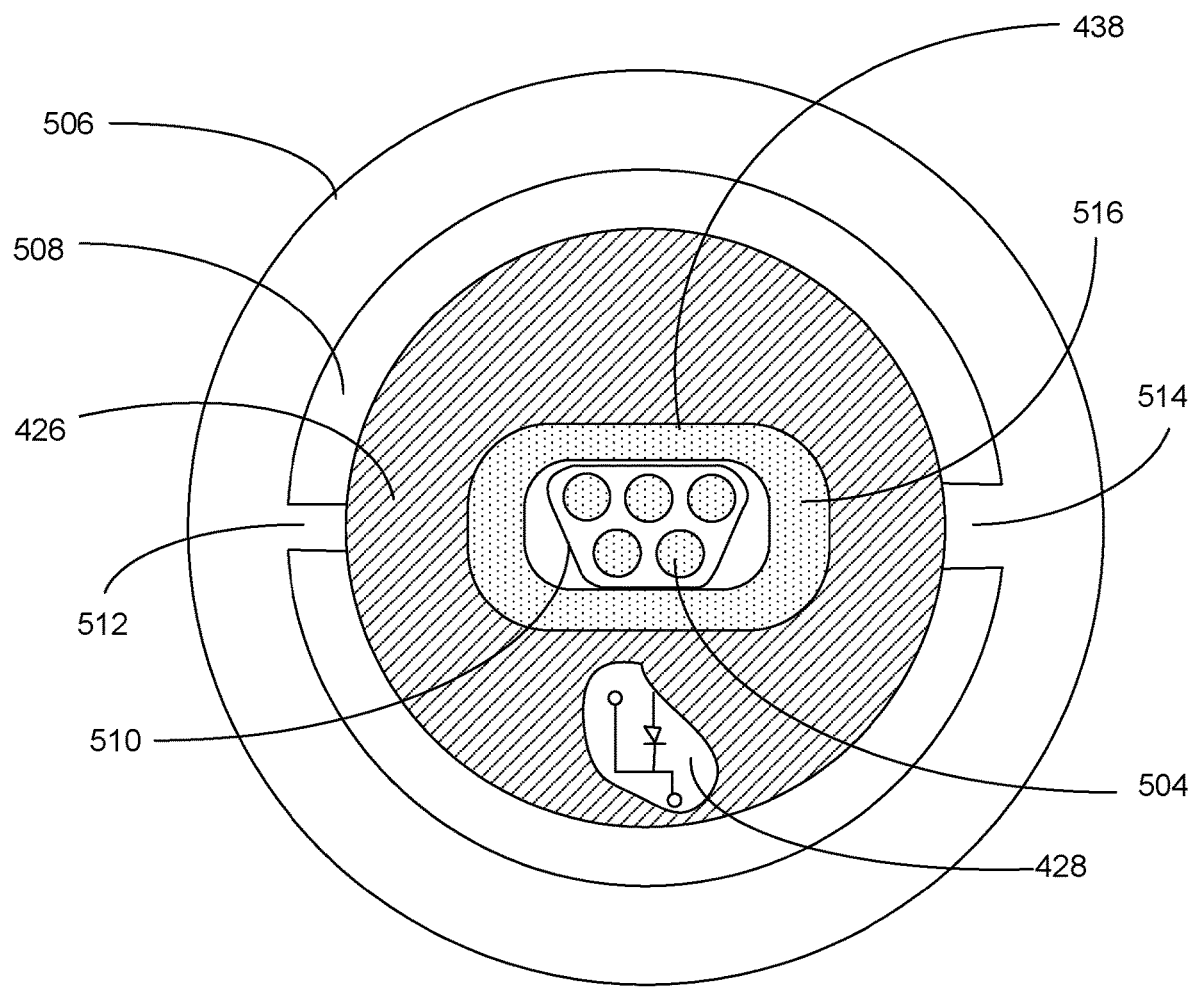
FIG. 5 is a top plan view illustrating an exemplary embodiment of a magnetic connector of the exemplary whip light of FIG. 1 of the exemplary whip light system of FIG. 3, according to a preferred embodiment of the present invention.

FIG. 5 is a top plan view illustrating an exemplary embodiment of a first magnetic electrical connector 438 of the exemplary whip light 100 of FIG. 1 of the exemplary whip light system 300 of FIG. 3, according to a preferred embodiment of the present invention. The head 506 of base cover 102 (see FIG. 7) has an inner concentric circular ridge 508 with a small radial groove 512 and an opposed large radial groove 514 for alignment with the connector portion 112, which has corresponding radial protrusions. When connecting the handle 126 to the base 124, the handle 126 must be rotated around its long axis until the grooves 512 and 514 align with the corresponding radial protrusions. The width of the grooves 512 and 514 are different to ensure only one orientation is possible. Small PCB 428, shown in cutaway, supports the first magnetic electrical connector 438 and is otherwise covered with a waterproof grommet 426. First magnetic electrical connector 438 includes a magnetic rim 516 and a five-magnet 504 (one of five labeled) electrical connector 510. The magnets 504 are electrical contacts: two for electrical power, two for control signaling, and one for the Bluetooth® antenna.

Figure 6:
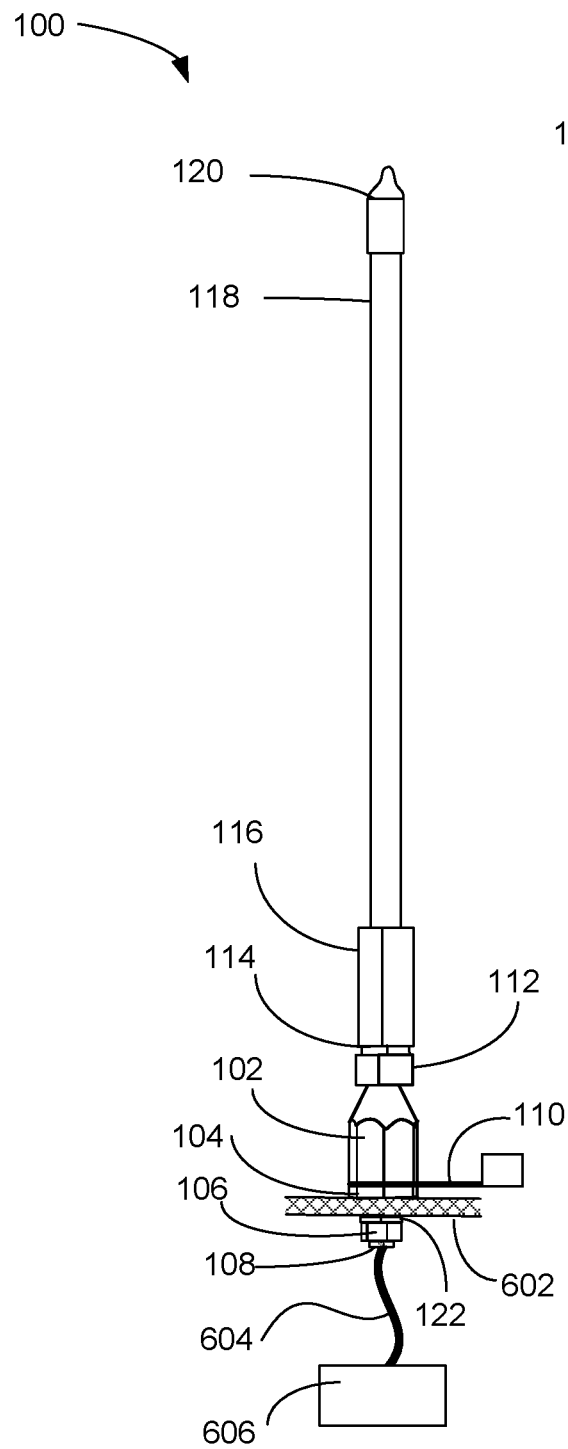
FIG. 6 is a side elevation diagrammatic view illustrating an exemplary embodiment of the whip light of FIG. 1 of the exemplary whip light system of FIG. 3, according to a preferred embodiment of the present invention.

FIG. 6 is a side elevation diagrammatic view illustrating an exemplary detail of the exemplary embodiment of the whip light 100 of the whip light system 300 of FIG. 3, according to a preferred embodiment of the present invention. Whip light base 124 is shown attached to a portion of a vehicle body 602, with base 124 installed and nut 106 threaded onto lower hollow threaded tube 108. Power lines 604 extend to a power source 606 within the vehicle.

Figure 7:
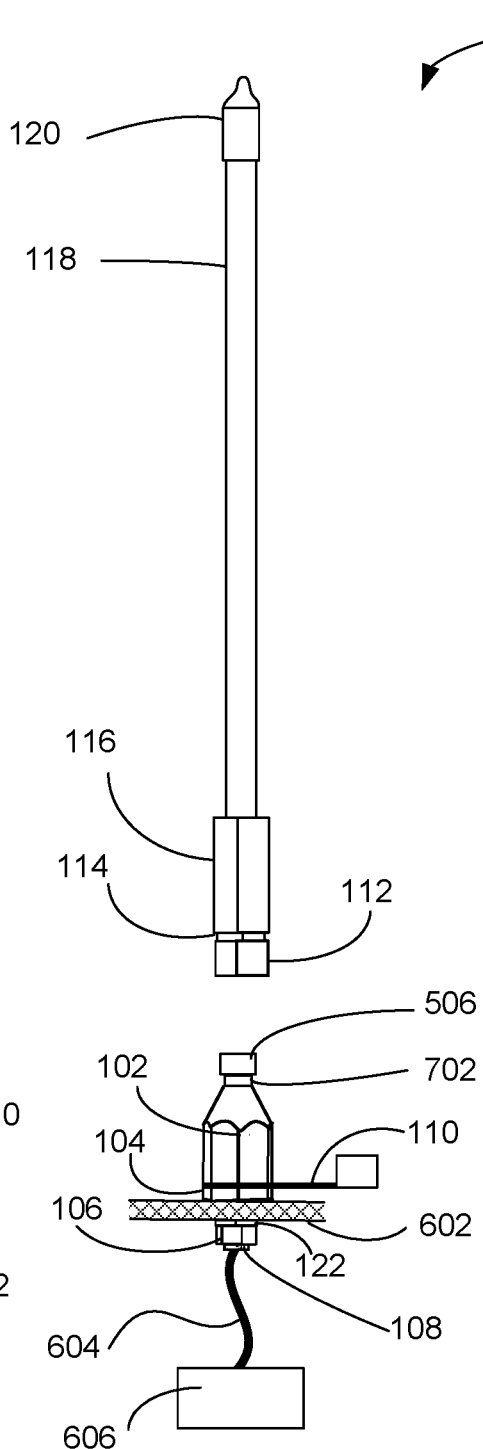
FIG. 7 is a side elevation diagrammatic view illustrating the exemplary embodiment of the whip light of FIG. 1 of the exemplary whip light system of FIG. 3, according to a preferred embodiment of the present invention.

FIG. 7 is a side elevation diagrammatic view illustrating the exemplary embodiment of the whip light 100 of FIG. 1 of the exemplary embodiment of the whip light system 300 of FIG. 3, according to a preferred embodiment of the present invention. When disconnected, the head 506 of the base cover 102 and the neck 702 of the base cover 102 can be seen. In operation, when handle 126 is reconnected to base 124, the user presses the handle down over the head 506, rotating the handle 126 to align grooves 512 and 514 to corresponding radial protrusions in connector portion 112 of handle 126 until the handle 126 seats, allowing the spring-biased ball bearings 418 to protrude into the neck 702 to hold the handle 126 to the base 124. This same action brings the first and second magnetic electrical connectors 438 and 414 into abutment, magnetic attachment, and electrical conduction. To replace the handle 126 on the base 124, the handle 126 is pressed down over the head 506 and rotated to align the grooves 512 and 514. In the disconnected state, flexible water-tight cover 110 is bent around to cap off the head 506 of the base cover 102.

Both connection and disconnection of the handle 126 with the base 124 can be accomplished with one hand, which is an advantage of the present invention. Not having pins and pin receivers for electrical connections is an advantage of the present invention, as it avoids damage to the pins during physical connection. Having the lighting controller inside the base cover 102, so that a separate controller is not required inside the vehicle, is another advantage of the present invention. Likewise, the base 124 can be removed and installed on another vehicle without having to move a controller internal to the vehicle, which is another advantage of the present invention.

We claim:
1. A whip light system comprising:
   a. a whip light comprising a base, a handle extending axially from said base, and a tube extending axially from said handle;
   b. a plurality of light sources on an elongated printed circuit board (PCB) within said tube;
   c. a light controller within said base;
   d. a Bluetooth® wireless transceiver within said base and in communication with said light controller;
   e. a downloadable smart phone application operable to enable control of said light controller via said Bluetooth® wireless transceiver using said smart phone.

2. The whip light system of claim 1, comprising a smart phone having an installed application operable to command said light controller via said Bluetooth® wireless transceiver.

3. The whip light system of claim 1, wherein said base and said handle comprise:
  a. a releasable mechanical connection comprising a plurality of spring-biased ball bearings; and
  b. releasable electrical connections comprising respective first and second opposed and releasably connectable magnetic electrical connectors.

4. The whip light system of claim 2, wherein said releasable connection between the handle and the base is manually operable with one hand.

5. The whip light system of claim 1, wherein said base comprises:
  a. an internal circuitry section;
  b. a base cover enclosing said internal circuitry section;
  c. a first hollow threaded tube extending from a first end of said internal circuitry section;
  d. a second hollow threaded tube extending from a second opposed end of said internal circuitry section connected to said first hollow threaded tube via a lumen;
  e. a first PCB within said internal circuitry section, wherein said first PCB within said internal circuitry section comprises:
    i. said Bluetooth® wireless transceiver; and
    ii. said light controller;
  f. a first magnetic electrical connector mounted on a second PCB within said internal circuitry section and in communication with said first PCB.

6. The whip light system of claim 1, wherein said handle comprises:
  a. a connector portion;
  b. an interface connector support partially inserted with said connector portion;
  c. a second magnetic electrical connector, mounted on a third PCB, mounted in said interface connector support and in communication with said elongated PCB within said tube;
  d. a wiring sleeve having:
    i. a lower portion having an outside diameter adapted to slidingly engage within an upper portion of said interface connector support; and
    ii. an upper portion having an inside diameter adapted to slidingly receive said tube; and
  f. a handle sleeve having an inner diameter adapted to slidingly receive said upper portion of said wiring sleeve.

7. The whip light system of claim 6, wherein said connector portion comprises:
  a. a shell having a polygonal external perimeter and a cylindrical axial through bore; and
  b. a spacing ring within said bore supporting a spring.

8. The whip light system of claim 6, wherein said tube comprises:
  a. an outside diameter configured to be slidingly received into said top portion of said wiring sleeve; and
  b. a water resistant cap having a tip with a hole through said tip.

9. The whip light system of claim 1, wherein said plurality of light sources on said elongated PCB within said tube comprises a plurality of light emitting diodes (LEDs) arranged on said elongated PCB to emit light in all radial directions from a long axis of said elongated PCB.

10. The whip light system of claim 9, where said plurality of LEDs comprise at least one of:
  a. a red-green-blue LED; and
  b. a white LED.

11. A whip light system comprising:
  a. a whip light comprising a base, a handle extending axially from said base, and a tube extending axially from said handle;
  b. a plurality of light sources on an elongated printed circuit board (PCB) within said tube;
  c. a light controller on a first PCB in an internal circuitry section enclosed by a base cover of said base and in communication with said plurality of light sources;
  d. a Bluetooth® wireless transceiver on said first PCB in said internal circuitry section enclosed by said base cover of said base and in communication with said light controller; and
  e. a downloadable smart phone application operable to enable control of said light controller via said Bluetooth® wireless transceiver using said smart phone.

12. The whip light system of claim 11, comprising:
  a. a releasable mechanical connection between said handle and said base comprising a plurality of circumferentially arranged spring-biased ball bearings and a neck of a base cover;
  b. releasable electrical connections comprising respective first and second opposed magnetic electrical connectors alignable to be brought into abutment; and
  c. wherein said releasable mechanical and said releasable electrical connection between said handle and said base is configured to be manually operable with one hand.

13. The whip light system of claim 11, wherein said base comprises:
  a. said internal circuitry section;
  b. said base cover enclosing said internal circuitry section;
  c. a first hollow threaded tube extending from a first end of said internal circuitry section;
  d. a second hollow threaded tube extending from a second opposed end of said internal circuitry section connected to said first hollow threaded tube via a lumen; and
  e. a first magnetic electrical connector mounted on a second PCB within said internal circuitry section and in communication with said first PCB.

14. The whip light system of claim 11, wherein said handle comprises:
  a. a connector portion;
  b. an interface connector support partially inserted within said connector portion;
  c. a second magnetic electrical connector, mounted on a third PCB, mounted in said interface connector support and in communication with said elongated PCB within said tube;
  d. a wiring sleeve having:
    i. a lower portion having an outside diameter adapted to slidingly engage within an upper portion of said interface connector support; and
    ii. an upper portion having an inside diameter adapted to slidingly receive said tube; and
  e. a handle sleeve having an inner diameter adapted to slidingly receive said upper portion of said wiring sleeve;
  f. wherein said connector portion comprises:
    i. a shell having a polygonal external perimeter and a cylindrical axial through bore; and
    ii. a spacing ring within said bore supporting a spring.

15. The whip light system of claim 11, wherein said tube comprises:
  a. an outside diameter configured to be slidingly received into said top portion of said wiring sleeve; and b. a water resistant cap having a tip with a hole through said tip.

16. The whip light system of claim 11, wherein:
 a. said plurality of light sources on said elongated PCB within said tube comprises a plurality of light emitting diodes (LEDs) arranged on said elongated PCB to emit light in all radial directions from a long axis of said elongated PCB; and
 b. wherein said plurality of LEDs comprise at least one of:
  i. a red-green-blue LED; and
  ii. a white LED.

17. A whip light system comprising:
 a. a whip light comprising a base, a handle extending axially from said base, and a tube extending axially from said handle;
 b. a plurality of light sources on an elongated printed circuit board (PCB) within said tube;
 c. a light controller on a first PCB in an internal circuitry section enclosed by a base cover of said base and in communication with said plurality of light sources;
 d. a Bluetooth® wireless transceiver on said first PCB in said internal circuitry section enclosed by said base cover of said base and in communication with said light controller; and
 e. a downloadable smart phone application operable to enable control of said light controller via said Bluetooth® wireless transceiver using said smart phone;
 f. a releasable mechanical connection between said handle and said base comprising a plurality of circumferentially arranged spring-biased ball bearings and a neck of a base cover;
 g. releasable electrical connections comprising respective first and second opposed magnetic electrical connectors alignable to be brought into abutment; and
 h. wherein said releasable mechanical and said releasable electrical connection between said handle and said base is configured to be manually operable with one hand.

18. The whip light system of claim 17, wherein said base comprises:
 a. said internal circuitry section;
 b. said base cover enclosing said internal circuitry section;
 c. a first hollow threaded tube extending from a first end of said internal circuitry section;
 d. a second hollow threaded tube extending from a second opposed end of said internal circuitry section connected to said first hollow threaded tube via a lumen; and
 e. a first magnetic electrical connector mounted on a second PCB within said internal circuitry section and in communication with said first PCB.

19. The whip light system of claim 17, wherein said handle comprises:
 a. a connector portion;
 b. an interface connector support partially inserted within said connector portion;
 c. a second magnetic electrical connector, mounted on a third PCB, mounted in said interface connector support and in communication with said elongated PCB within said tube;
 d. a wiring sleeve having:
  i. a lower portion having an outside diameter adapted to slidingly engage within an upper portion of said interface connector support; and
  ii. an upper portion having an inside diameter adapted to slidingly receive said tube; and
 e. a handle sleeve having an inner diameter adapted to slidingly receive said upper portion of said wiring sleeve;
 f. wherein said connector portion comprises:
  i. a shell having a polygonal external perimeter and a cylindrical axial through bore; and
  ii. a spacing ring within said bore supporting a spring.

20. The whip light system of claim 17, wherein said tube comprises:
 a. an outside diameter configured to be slidingly received into said top portion of said wiring sleeve; and
 b. a water resistant cap having a tip with a hole through said tip;
 c. wherein:
  i. said plurality of light sources on said elongated PCB within said tube comprises a plurality of light emitting diodes (LEDs) arranged on said elongated PCB to emit light in all radial directions from a long axis of said elongated PCB; and
  ii. wherein said plurality of LEDs comprise at least one of:
   1. a red-green-blue LED; and
   2. a white LED.

\* \* \* \* \*